April 24, 1956 A. L. LE FEBVRE ET AL 2,743,064

APPARATUS FOR FEEDING A COMBINED CARRIER TAPE AND ADHESIVE TAPE AND FOR SEPARATING THE TAPES

Filed Dec. 28, 1953 5 Sheets-Sheet 1

INVENTOR.
Alfred L. LeFebvre, Douglas M. Small,
BY Alvin O. Johnson and George A. Cleveland.
Ross & Ross Atty's & Agt.

April 24, 1956 A. L. LE FEBVRE ET AL 2,743,064

APPARATUS FOR FEEDING A COMBINED CARRIER TAPE AND ADHESIVE TAPE AND FOR SEPARATING THE TAPES

Filed Dec. 28, 1953 5 Sheets-Sheet 2

INVENTOR.

Alfred L. LeFebvre, Douglas R. Fenk(?)

BY Alvin O. Johnson and

Rasoi Ross(?) atty & Agent George A. Cleveland

INVENTOR.
Alfred L. LeFebvre, Douglas M. Small,
BY Alvin O. Johnson and
George A. Cleveland.
Ross & Ross
atty. & agent April 24, 1956 A. L. LE FEBVRE ET AL 2,743,064

APPARATUS FOR FEEDING A COMBINED CARRIER TAPE AND ADHESIVE TAPE AND FOR SEPARATING THE TAPES

Filed Dec. 28, 1953 5 Sheets-Sheet 4

INVENTOR.

Alfred L. LeFebvre, Douglas M. Small,

BY Alvin O. Johnson and George A. Cleveland.

Ross & Ross Atty. & Agent

April 24, 1956 A. L. LE FEBVRE ET AL 2,743,064

APPARATUS FOR FEEDING A COMBINED CARRIER TAPE AND ADHESIVE TAPE AND FOR SEPARATING THE TAPES

Filed Dec. 28, 1953 5 Sheets-Sheet 5

INVENTOR.
Alfred L. LeFebvre, Douglas M. Small,
BY Alvin O. Johnson and
George A. Cleveland.
Ross & Ross
Atty & Agent 2,743,064
Patented Apr. 24, 1956

2,743,064

APPARATUS FOR FEEDING A COMBINED CARRIER TAPE AND ADHESIVE TAPE AND FOR SEPARATING THE TAPES

Alfred L. Le Febvre, West Suffield, Conn., and Douglas M. Small, Springfield, and Alvin O. Johnson and George A. Cleveland, Westfield, Mass., assignors to Stanley Home Products, Inc., Westfield, Mass., a corporation of Massachusetts Application December 28, 1953, Serial No. 400,732

2 Claims. (Cl. 242—55)

This invention relates to adhesive tape apparatus and is directed more particularly to apparatus for providing successive lengths of adhesive tape.

The principal objects of the invention are directed to the provision of apparatus for separating adhesive tape from the supporting tape therefor and cutting the adhesive tape into successive lengths.

A type of tape for which the apparatus of the invention is adapted is of a plastic nature inherently tacky and supported by a carrier tape which may be paper. The adhesive tape must be separated from the carrier and when subjected to heat and pressure between objects to be secured together it serves as a firm bonding medium.

According to this invention, apparatus is provided for receiving a roll of combined adhesive and carrying tape and continuously separating said tapes, cutting the adhesive tape into successive predetermined lengths and winding up the carrier tape.

All of the above objects we accomplish by means of such structure and relative arrangements of parts thereof, as will fully appear by a perusal of the description below and by various specific features which will be hereinafter set forth.

To the above cited and other ends and with the foregoing and various other novel features and advantages and other objects of our invention as will become more readily apparent as the description proceeds, our invention consists in certain novel features of construction and in the combination and arrangement of parts as will be hereinafter more particularly pointed out in the claims hereunto annexed and more fully described and referred to in connection with the accompanying drawings wherein:

Figures 1, 2, 3:
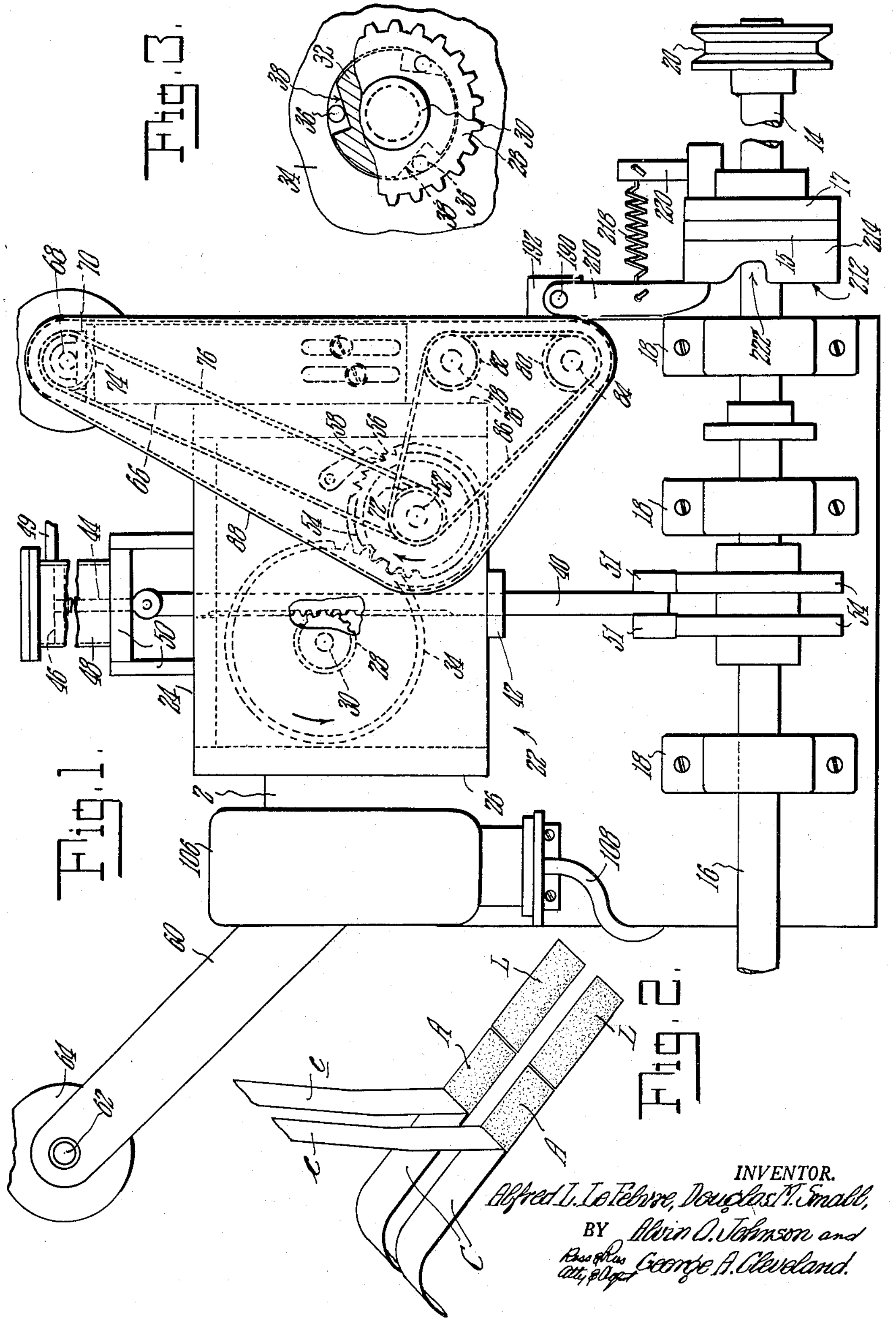
Fig. 1 is a front elevational view of the apparatus embodying the novel features of the invention.
Fig. 2 is a small scale perspective view showing a pair of tapes.
Fig. 3 is a front elevational view of a portion of the prime operating mechanism of the apparatus shown in Fig. 1.

Referring now to the drawings more in detail, the invention will be fully described.

Front and rear walls 2 and 4 have plates such as 6 secured to inner faces thereof. Upper transverse struts 8 and 10 have opposite ends secured to members 6 to hold the front and rear walls in transverse spaced relation. A lower bridge member 12 has its opposite ends secured to the members 6.

A main drive shaft consisting of parts 14 and 16 are connected by coupling members 15 and 17 fixed thereto and the shaft part 16 is rotatable in bearings 18 secured to the front wall 2. The shaft part 14 may have a pulley 20 fixed thereto which is connected by a belt to a source of power or the said shaft may be driven in any other manner desired.

A housing 22 is secured to the outer face of the front wall 2 and has an upper wall 24 and side walls 26, see Fig. 1.

A pinion 28 within the housing is rotatable on a stud 30 and has a hub 32 on which a gear 34 is rotatable as in Fig. 3. Said hub 32 is clutched to the gear 34 in a well known manner as by rolls or balls 36 disposed in peripheral recesses of the hub which have inclined bottoms 38. Any desired form of clutch may be employed so that the gear 34 is driven by the pinion in rotation thereof in one direction.

In counterclockwise rotation of the pinion, the clutch mechanism acts to rotate the gear 34 counterclockwise. In clockwise rotation of the pinion, the pinion and gear are disconnected.

A rack 40 in engagement with pinion 28 is reciprocable up and down in a guide 42 and is connected at its upper end to a piston rod 44 of a piston 46 which is reciprocable in a cylinder 48 supported by bracket means 50 secured to the upper side of the wall 2, see Fig. 1.

The lower end of the rack 40 has rolls 51 journalled thereon which ride on cams 54 fixed to the shaft part 16. The cylinder 48 may be connected to a source of air pressure by connection 49 so that the piston is urged downwardly. The cams 54 will be of well known form so that as the shaft part 16 is in rotation, the rack 40 is moved upwardly and allowed to move downwardly.

As the rack moves upwardly the pinion 28 and gear 34 through the clutch mechanism are rotated counterclockwise while as the rack is moved downwardly the gear 34 is at rest. Thus, there is intermittent counterclockwise rotation of gear 34.

A transverse drive shaft 52 is journalled in the walls 2 and 4 and a forward end thereof within housing 22 has a gear 54 fixed thereto which meshes with gear 34. A ratchet wheel 56 fixed to said shaft 52 is held against counterclockwise rotation by a pawl 58 in the well known manner, see Fig. 1.

The drive shaft 52 is rotated intermittently in clockwise direction or operates intermittently for tape feeding.

An arm 60 is fixed to and extends to the left from wall 2 and has an arbor 62 at its upper end for a spool 64 of tape. A column 66 is fixed to said wall 2 and extends upwardly at the right hand end thereof. An arbor 68 is rotatable in a bearing 70 fixed to said column.

The drive shaft 52 within the housing 22 has a pair of sprockets such as 72 fixed thereto. A sprocket 74 is fixed to arbor 68 and a chain 76 connects one of the sprockets 72 and sprocket 74 for intermittent rotation of arbor 68.

The arbor carries take-up means such as a reel or spool that is frictionally driven to take up carrier tape as will appear. Such take-up are well known in the art and operate to take up and wind up material as it becomes available.

A driven shaft 78 journalled in walls 2 and 4 has a sprocket 82 fixed thereto and an idler sprocket 80 is rotatable on a stud 84 of wall 2. A chain 86 in engagement with one of the sprockets 72 and the sprocket 82 passes over the idler sprocket 80 whereby said shaft 78 is rotated intermittently.

A guard 88 is provided for covering the chain and sprocket drive means and is secured to the housing and wall in any well known manner.

Means for feeding the tape and for separating the adhesive tape from the carrier tape and for cutting the adhesive tape into lengths will now be described with particular reference to Figs. 4 and 5.

As previously referred to, the adhesive tape is made from plastic which has an inherent tackiness but is subjected to heat and pressure between objects which are to be secured together. The adhesive tape adheres to a carrier tape and these as a combined tape are in roll form 94 on spool 64.

Figure 4:
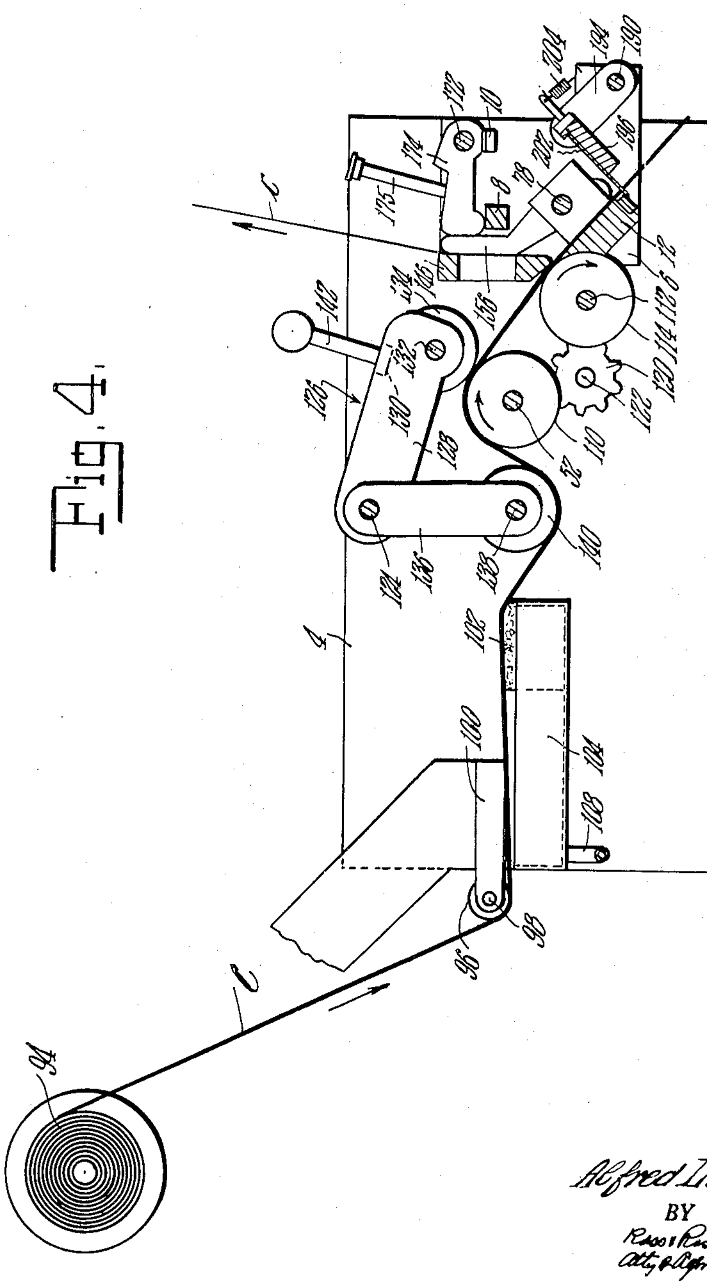
Fig. 4 is a longitudinal elevational sectional view through the apparatus shown in Fig. 1.

The combined tape indicated by C passes over a guide roll 96 on a spindle 98 of a bracket 100 fixed to wall 4 and over a resilient pad 102 of a tank 104, see Fig. 4. A reservoir 106, see Fig. 1, connected by a tube 108 supplies liquid to the reservoir. Said liquid may be water or whatever may be necessary to prevent the inherently tacky adhesive tape from sticking to the elements to be described.

In Fig. 2 the combined adhesive and carrier tape are represented by C, the carrier tape by *c*, the adhesive tape by A, and the lengths of adhesive tape by L.

The apparatus shown operates on a pair of tapes but may be adapted for one or several tapes, as may be desired.

The intermittently rotated shaft 52 is provided with roll 110 and a transverse shaft 112 journalled in walls 2 and 4 is provided with a similar roll 114.

Gears 116 and 118 fixed to said shafts 52 and 112 mesh with an idler gear 120 rotatable on a stud 122 of the rear wall 4 whereby said rolls are rotated simultaneously in feeding direction for feeding the tape C forwardly.

A shaft 124 has opposite ends fixed in walls 2 and 4. Levers 126 have transversely spaced side arms 128 connected by transverse members 130. Outer ends of said arms 128 are journalled on shaft 124 and inner ends of the levers carry rods 132 on which dual rolls 134 are rotatable. Links 136 fixed on shaft 124 and depending therefrom have a rod 138 in lower ends thereof and a roll 140 is rotatable thereon.

As will be seen in Fig. 4, the rolls 140 form a depending loop in the tape C to provide a suitable contact with roll 110. The roll 134 urges the tape C onto the said roll 110 whereby said roll 110 acts as a feed roll.

The levers 126 may be swung counterclockwise to release the tape C and for that purpose said levers 126 are provided with manually engageable members 142. Rolls 110 and 134 may be termed initial feed rolls.

A transverse separator 146 has opposite ends in suitable slots of the walls 2 and 4 and is held in place by brackets 147. The lower end of the separator is provided with a transverse nose 146′.

The tape C is fed forwardly between roll 114 and the nose 146′ of the separator. The carrier tape *c* extends upwardly to the take-up and the adhesive tape A moves across the bridge 12 to final feed mechanism and cut-off mechanism, the take-up being rotated intermittently similarly to rolls 110 and 114.

Figures 5, 6, 7:
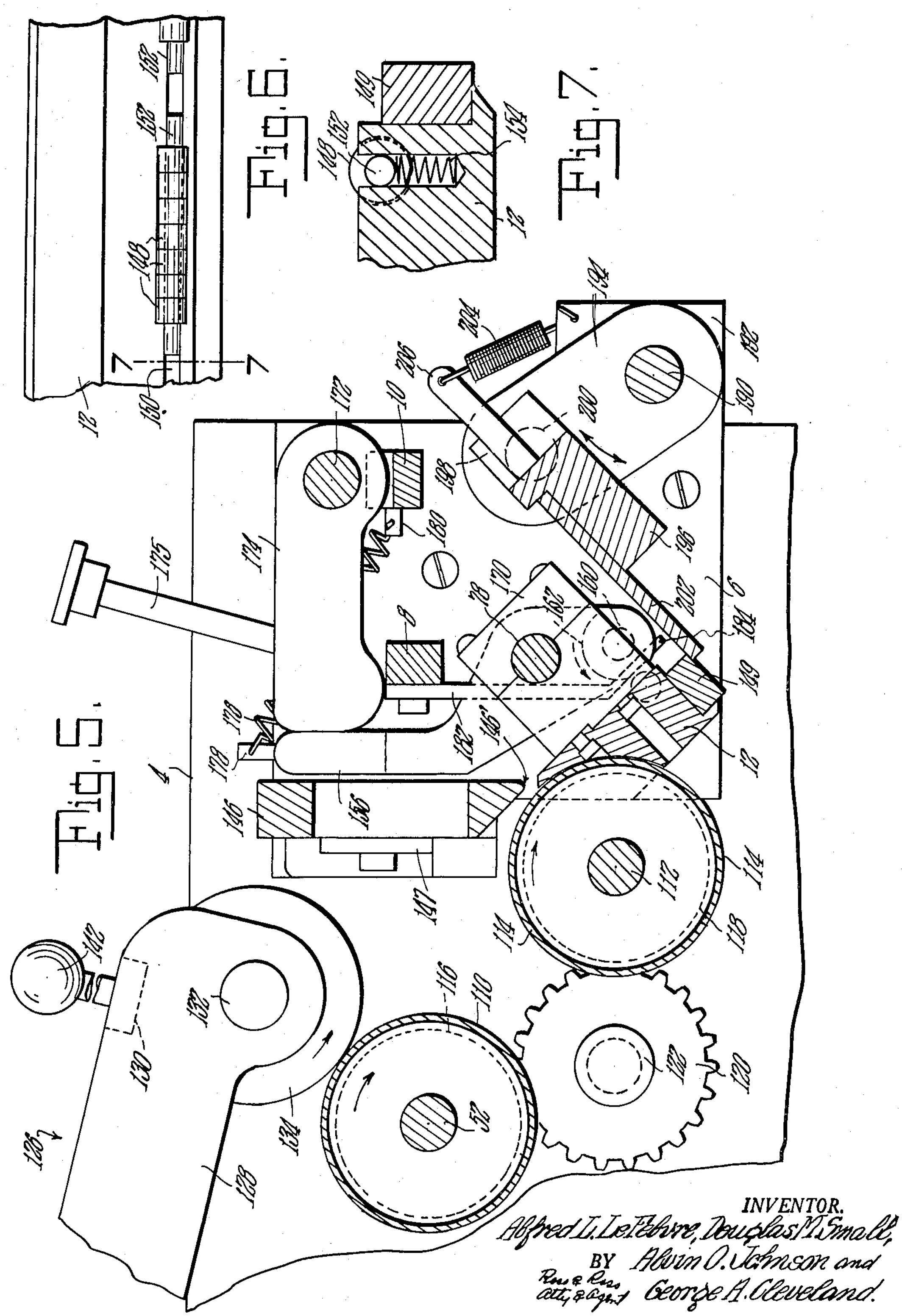
Fig. 5 is an enlarged partial longitudinal sectional elevational view similar to Fig. 4.
Fig. 6 is a partial plan view of the lower pressure means of the lower transverse bridge of the apparatus.
Fig. 7 is a transverse sectional view on the line 7—7 of Fig. 6.
Figure 8:
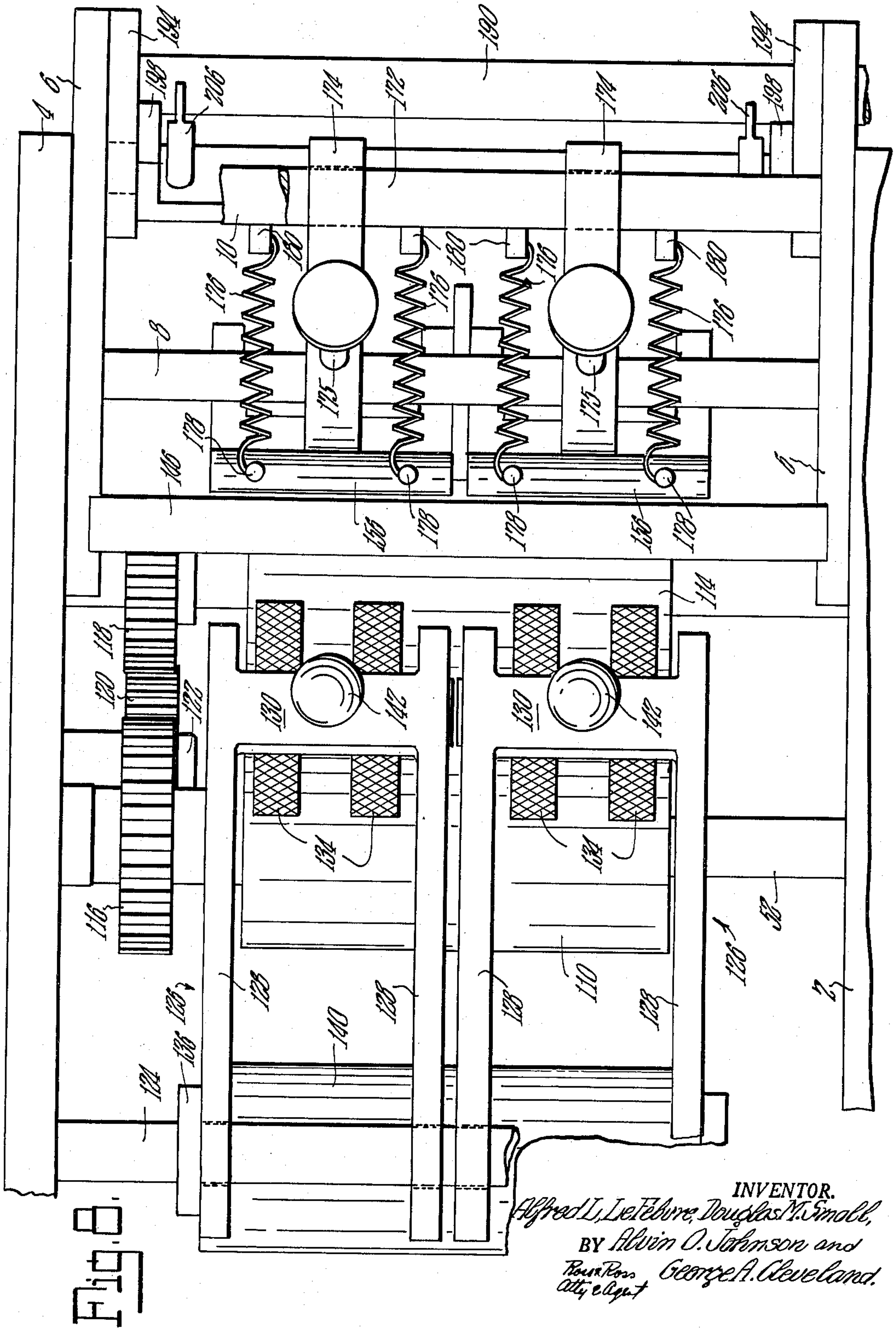
Fig. 8 is a plan view of the parts of the apparatus shown in Fig. 5.

The bridge 12 is provided with a stationary transverse cutting bar 149 at its forward portion and rearwardly or inwardly thereof there are sets of rolls 148 best shown in Figs. 6 and 7.

The bridge 12 is provided with a slot or slots 150 in which shafts 152 are movable up and down. The rolls 148 are rotatable on the shafts 152 and springs such as 154 in the slots beneath the shafts 152 urge the shafts and rolls upwardly.

Figures 9, 10, 11:
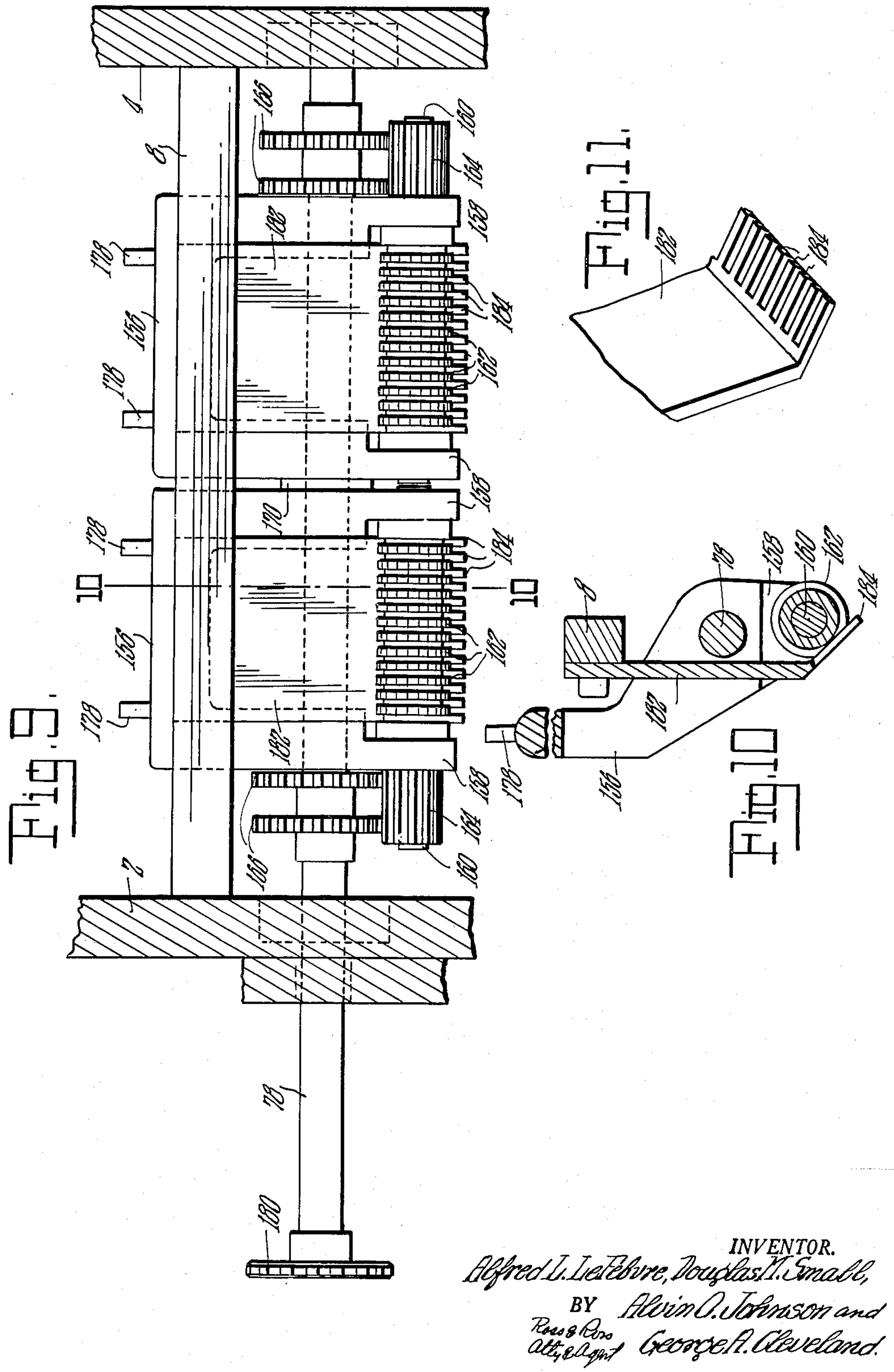
Fig. 9 is an elevational view of the final feed roll means of the apparatus.
Fig. 10 is a transverse sectional elevational view on the line 10—10 of Fig. 9.
Fig. 11 is a partial perspective view showing the comb for the final feed rolls.

Roll carriers 156 are oscillatable on previously referred to shaft 78 and have lower transversely spaced end portions 158, see Fig. 9. Shafts 160 rotatable in said portions 158 have rolls fixed thereto which are formed to have longitudinally spaced rings 162. Gears 164 fixed on shafts 160 mesh with gears 166 fixed to shaft 78.

A bearing 170 is secured to the bridge 12 between the roll carriers 156 in which said shaft 78 is rotatable.

A rod 172 fixed to and extending between the walls 2 and 4 is provided on which arms 174 are swingable. Inner ends of the arms in the position shown bear against the upper ends of members 156. Springs 176 have opposite ends engaged with anchors 178 and 180 of the carriers 156 and member 10. Said arms 174 are provided with manually engageable members 175 for swinging said arms clockwise away from the carriers 156.

The components may be arranged so that the driven rolls of the carriers and rolls 148 therebelow function as the final feed means for the adhesive tape.

Comb members 182 are secured to the transverse member 8 and have a plurality of fingers 184 at lower ends for lying between the rings 162 to prevent adherence of the adhesive tape A to the said rings.

A shaft 190 rotatable in portions 192 of the side walls has levers 194 fixed thereto. A transverse cutter bar 196 has end ears 198 which are provided with trunnion 200 journalled in levers 194. A blade 202 is fixed to the bar 196 and as the shaft 190 oscillates the blade 202 moves relative to the stationary cutter blade 149 to sever the adhesive tape A being fed across the bridge 12. Springs 204 have opposite ends secured to members 192 and anchors 206 fixed to the cutter bar to hold the blade 202 against blade 149. Said blade 202 has its lower end disposed angularly so that in upper position it does not swing from off the blade 149 but permits adhesive tape to pass thereunder when in said upper position.

A lever 210, see Fig. 1, is fixed to shaft 190 which has a lower end on the face 212 of a cam 214 fixed to shaft 16. A spring 218 has opposite ends secured to lever 210 and to an anchor 220 carried by a part extending from wall 2. The cam 212 is provided with a recess 222 and as the shaft 16 rotates the lever 210 is drawn by spring 218 into the recess 222 of the cam so that shaft 190 is operated for actuating the cutter blade 202.

It will be understood that such of the rolls shown and described may be knurled or crowned as may be desired or necessary or they may be both crowned and knurled in a manner well known in the art.

The take-up means for the carrier tape *c* associated with arbor 68 will be of a form well known in the art where a spool or core on which the tape is wound is frictionally driven so as to exert sufficient tension on said tape C to draw it upwardly around and past the separator and separate it from the adhesive tape between the final feed rolls.

In operation, the combined or superposed adhesive and carrier tapes are intermittently unwound and guided from a roll by rolls 110 and 134 and across a moistening pad, where the adhesive tape requires moistening agent or lubricant. The tape C passes between the so-called separator and bridge and across the latter. The carrier tape *c* is wound up by the take-up whereby the carrier tape is separated from the adhesive tape A which is engaged between the driven upper roll and spring-pressed roll therebelow. The said rolls 148 and 162 finally feed the adhesive tape A relative to the cutting means whereby a length of adhesive tape is cut.

The means for feeding the combined tapes and for taking up the carrier tape and for feeding the adhesive tape are operated intermittently so as to feed a predetermined length of adhesive tape to the cutting mechanism. The cutting mechanism operates intermittently and alternately relative to the feeding means so that the desired length of tape is fed to the cutting means for the action thereof.

The gear ratios may be selected to provide feeding of the adhesive tape to obtain lengths of adhesive tape desired and the cut lengths may be delivered to other means to facilitate adhesively securing together of objects.

While the apparatus shown and described is adapted for use with a pair of combined carrier and adhesive tapes, it will be understood that the novel features of the invention are adapted for the provision of apparatus for a single or several combined tapes.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What is desired to claim and secure by Letters Patent of the United States is:

1. Apparatus for feeding a separable continuous combined tape including a carrier tape and adhesive tape and for separating said carrier tape and adhesive tape comprising in combination, a supporting structure including transversely spaced side frames, means for supporting said roll of combined tape, means for rolling up one of said tapes subsequent to separation of said tapes, main operating means, means for actuating said means for rolling up said one tape actuated from said main operating means, links having one end pivoted between said side frames, an initial roll rotatable on and between opposite ends of said links for receiving a combined tape from a roll thereof, a first feeding roll journalled between said side frames for receiving a combined tape from said initial roll and a second feeding roll for receiving a combined tape from said first feeding roll, gear means connecting said first and second feeding rolls for simultaneous rotation thereof, levers having one end pivoted between said side frames, a roll pivoted on and between opposite ends of said levers for bearing on a combined tape on said first feeding roll, intermittently operating means connected to said main operating means and gear means, roll means for receiving one of said tapes from said second feeding roll, and a separator over which the other tape passes to said rolling up means.

2. Apparatus set forth in claim 1 wherein the said one ends of the links and levers pivoted between the side frames are pivoted on a common axis.

References Cited in the file of this patent

UNITED STATES PATENTS

| | | |
|---|---|---|
| 677,518 | Jacobs | July 2, 1901 |
| 763,804 | Seiberling | June 28, 1904 |
| 1,505,425 | Raber | Aug. 19, 1924 |
| 1,836,546 | Oliver | Dec. 15, 1941 |
| 2,293,433 | Gautier | Aug. 18, 1942 |
| 2,656,063 | Kafka | Oct. 20, 1953 |